(12) United States Patent
Nair

(10) Patent No.: US 11,755,392 B2
(45) Date of Patent: Sep. 12, 2023

(54) EDGE CLOUD CACHING USING REAL-TIME CUSTOMER JOURNEY INSIGHTS

(71) Applicant: PayPal, Inc., San Jose, CA (US)

(72) Inventor: Rahul Nair, Leander, TX (US)

(73) Assignee: PayPal, Inc., San Jose, CA (US)

( * ) Notice: Subject to any disclaimer, the term of this patent is extended or adjusted under 35 U.S.C. 154(b) by 103 days.

(21) Appl. No.: 17/239,488

(22) Filed: Apr. 23, 2021

(65) Prior Publication Data
US 2022/0342733 A1    Oct. 27, 2022

(51) Int. Cl.
G06F 9/54     (2006.01)
H04L 67/10    (2022.01)
H04L 67/01    (2022.01)
H04L 67/52    (2022.01)

(52) U.S. Cl.
CPC ............ *G06F 9/547* (2013.01); *H04L 67/01* (2022.05); *H04L 67/10* (2013.01); *H04L 67/52* (2022.05)

(58) Field of Classification Search
None
See application file for complete search history.

(56) References Cited

U.S. PATENT DOCUMENTS

| | | | |
|---|---|---|---|
| 9,998,330 B1 * | 6/2018 | Peterson | H04L 41/5019 |
| 2014/0173132 A1 * | 6/2014 | Varney | H04L 67/06 |
| | | | 709/240 |
| 2015/0134645 A1 | 5/2015 | Adari et al. | |
| 2015/0220376 A1 * | 8/2015 | Srivastava | G06F 11/327 |
| | | | 714/37 |
| 2016/0301739 A1 * | 10/2016 | Thompson | H04L 67/561 |
| 2017/0346875 A1 * | 11/2017 | Wells | H04L 67/568 |
| 2018/0091619 A1 * | 3/2018 | Power | H04L 67/561 |
| 2018/0357094 A1 * | 12/2018 | Kim | G06F 3/04817 |

(Continued)

OTHER PUBLICATIONS

"Akamai API Capabilities", Akamai Community Website, May 18, 2018 [retrieved on Sep. 26, 2022], Retrieved from the Internet: <URL: https://community.akamai.com/customers/s/article/Akamai-API-Capabilities?language=en_US>. (Year: 2018).*

(Continued)

*Primary Examiner* — Kevin T Bates
*Assistant Examiner* — Dae Kim
(74) *Attorney, Agent, or Firm* — Haynes and Boone, LLP

(57) ABSTRACT

Systems and methods for smart cloud caching using edge computing and real-time customer journey insights are disclosed. In one embodiment, a system identifies a trend in communications received by a first edge cloud server, wherein each communication corresponds to a customer journey comprising user action steps performed in a client application. The system determines which user action steps cause API invocations to non-edge cloud servers and generates a sequence of API invocations in an order associated with the sequence of user action steps of the customer journey. The sequence of API invocations may be chained and/or bundled and stored in a cache for replication at edge cloud servers. The system may determine that the trend is pervasive in a geographical location based on satisfaction of a criteria, and replicate the cached sequence of API invocations at a cache of a second edge cloud server that services the geographical location.

20 Claims, 8 Drawing Sheets

(56) References Cited

U.S. PATENT DOCUMENTS

2020/0336923 A1* 10/2020 Li ........................ H04L 41/147
2020/0383623 A1* 12/2020 Wu ...................... G06V 10/764

OTHER PUBLICATIONS

"Why your APIs need a CDN solutions brief", Fastly website, 2016 [retrieved on Sep. 26, 2022], Retrieved from the Internet: <URL: https://assets.ctfassets.net/6pk8mg3yh2ee/3OIBrXoYbugymCMQCAskm2/33a2764a56fb17dab31df47ff0aa54ba/Fastly-Ecommerce-Solutions-Brief.pdf>. (Year: 2016).*

International Search Report and Written Opinion for Application No. PCT/US2022/024305 dated Aug. 12, 2022, 17 pages.

Ai et al., "Edge Computing Technologies for Internet of Things: a Primer", Digital Communication and Networks 4, 2018, 10 pages.

Costa, Jeff, "Improve API Performance with Caching", Part One, API Gateway, dated May 31, 2018, https://developer.akamai.com/blog/2018/05/31/improve-api-performance-caching, 19 pages.

LogRocket Blog, "Caching Strategies to Speed Up Your API", dated May 7, 2020, https://blog.logrocket.com/caching-strategies-to-speed-up-your-api/, 12 pages.

Katiyar, Sandeep, "Converging Edge Caching and Computing Power for Simultaneous Mobile and MSO Networks to Handle Latency Sensitive Services Using Co-Operative Caching", Technical Paper by SCTE-ISBE dated 2018, 12 pages.

Liu et al., "Caching at the Wireless Edge: Design Aspects, Challenges and Future Directions", dated Oct. 31, 2018, 19 pages.

* cited by examiner

EDGE CLOUD CACHING USING REAL-TIME CUSTOMER JOURNEY INSIGHTS

TECHNICAL FIELD

The present disclosure generally relates to cloud edge computing and more particularly to caching in edge computing based on real-time customer journey insights according to various embodiments.

BACKGROUND

The number of Internet-connected devices at the edge of a computing network is producing a massive amount of data to be computed at data centers, pushing network bandwidth requirements to the limit. Although there have been improvements in network technology, data centers oftentimes suffer from sluggish transfer rates and response times, which could hinder many applications. Edge computing is a distributed computing paradigm that brings computation and data storage closer to the location where it is needed. However, edge computing suffers from its own issues and challenges. For example, in some cases such as when edge servers used in edge computing rely on remotely located third-party servers, the edge servers cannot guarantee acceptable transfer rates and response times, which could be critical for many applications. Thus, there is a need in the art for improvements in edge cloud computing to provide content caching, delivery, storage, and other services that result in processing efficiencies such as better response times and transfer rates.

Figure 1A:
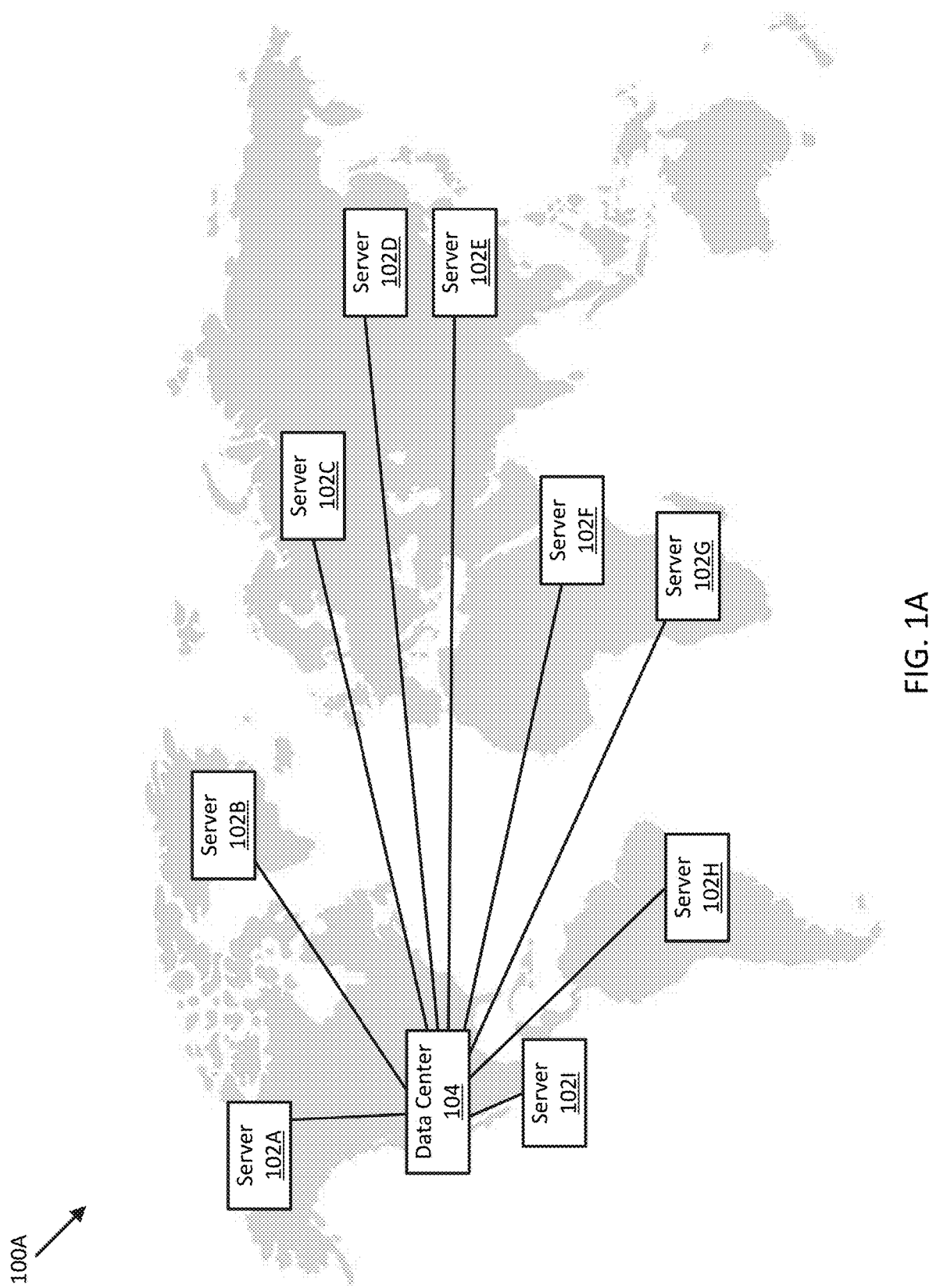
FIGS. 1A and 1B illustrate cloud computing environments in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In some embodiments, cloud computing may refer to on-demand availability of computer system resources, such as data storage, sharing data or resources, computing power, etc., without direct active management by the end user. FIG. 1A illustrates a cloud computing environment 100A in which a data center 104 is made available to users over the Internet. Services (e.g., delivery of applications and/or data) may be distributed over multiple locations at remote servers. As shown in FIG. 1A, in facilitating several services for users, data center 104 may communicate with servers 102A-102I spread across the globe as servers 102A-102I may provide cloud services to data center 104. For example, in one case, data center 104 may be an enterprise data center managed at least partially by an organization and servers 102A-102I may correspond to vendor services provided to the organization. Vendor services may include authentication services, chatbot services, customer feedback services, customer support services, employee management services, computer application integration services, etc. Servers 102A-102I may have Application Programming Interfaces (APIs) that allow requesting users/devices to use the services provided by the vendors.

Generally, as the distance (e.g., physical distance and/or node hop count) between data center 104 and each of servers 102A-102I increases, there will be greater latency present in the communications between servers 102A-102I and data center 104 as latency is dependent on the distance between the two communicating nodes. Additional latency may also be caused by delays in processing incoming data at intermediate node hops. The number of node hops required between two communicating end nodes may scale with the distance between the two communicating end nodes. Consequently, when there is latency in the communications, data center 104 services, which oftentimes rely on the communications with servers 102A-102I, can experience lengthy compute times due to, for example, slower response times and transfer rates. This may translate to slower response times in a user experience that relies on the data center 104.

Figure 1B:
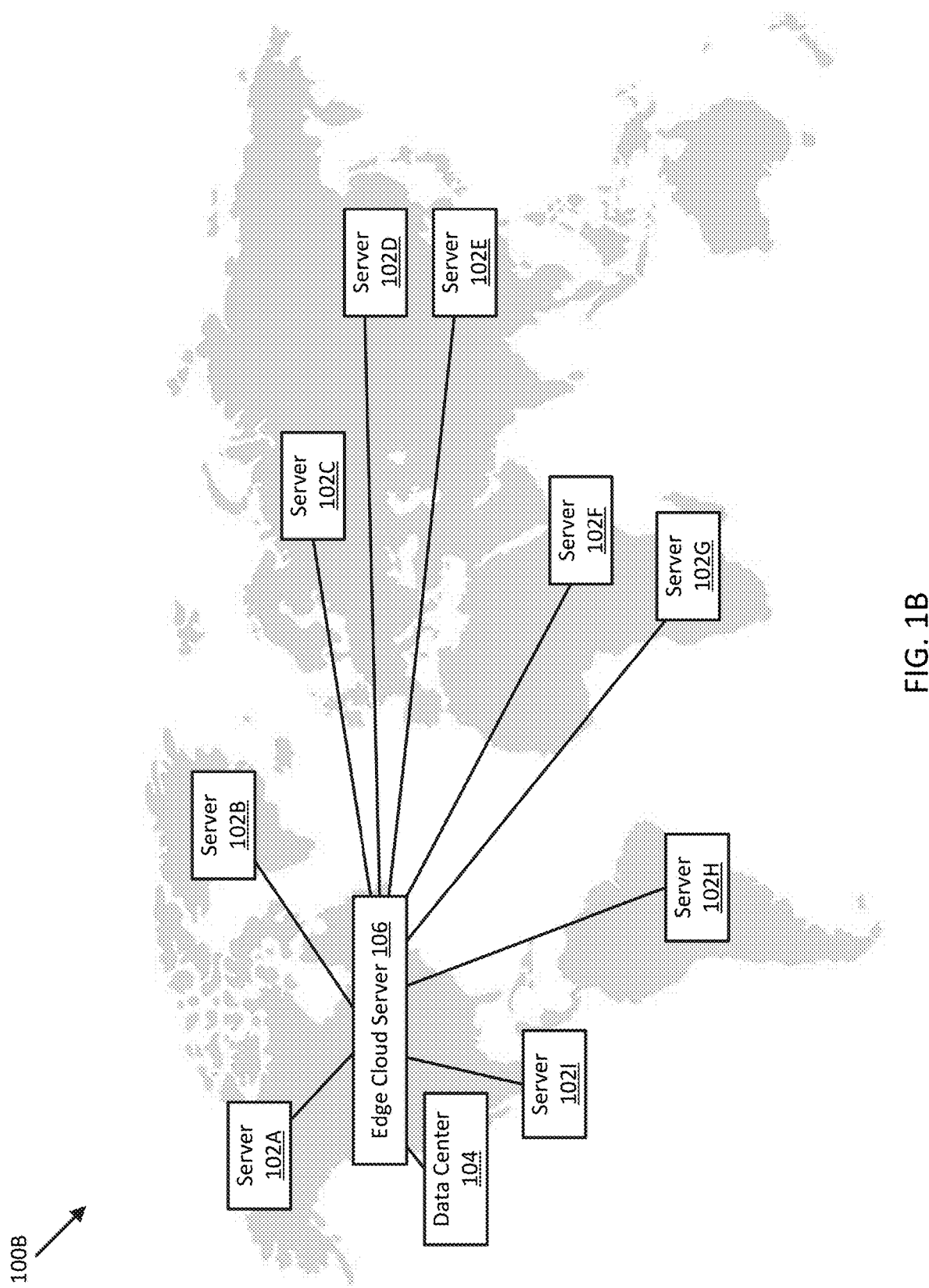

As illustrated in FIG. 1B, a cloud computing environment 100B may include an edge cloud server 106 for edge cloud computing. In some embodiments, edge computing is able to deliver low latency as computing is performed nearer to the requesting client (e.g., a client device making a request to retrieve data from the edge cloud server 106 at a specified resource). In some cases, edge computing can refer to computing outside the cloud (e.g., data center 104) and at the edge of a network in proximity to the requesting client. Generally, edge computing is suitable for applications in which real-time processing of data is desired. In many implementations, edge computing concentrates on the servers (e.g., nodes) that are in proximity to the last-mile network for requesting clients. In some embodiments, these servers may be referred to as edge cloud servers or edge cloud nodes where computation can be moved away from data centers and towards the edge of the network to perform tasks/services that may have otherwise been performed by the data center 104.

Referring to FIG. 1B, edge cloud server 106 may service a particular geographical location such that clients located in the particular geographical location will communicate with the edge cloud server 106 when making requests (e.g., requesting data from the edge cloud server 106). The communications between a client and the edge cloud server 106 may represent a customer journey in which a user is partaking as part of a user experience in an application (e.g., a mobile application or desktop application). For example, a user may be interacting with the application and taking certain actions within the application (e.g., customer journey steps) that correspond to communications transmitted between the client associated with the user and the edge cloud server 106. The collective communications between the client and the edge cloud server 106 may be part of a customer journey in which the user is partaking. As an example, the user may be partaking in a customer journey in which the customer journey steps are logging in to a payment transaction website, viewing a balance and history for the user's account, checking a refund status for a transaction, and logging out. Each of the above customer journey steps in the customer journey may correspond to communications that have to be sent between the client and the edge cloud server 106. Some or all of the communications in the customer journey may require the edge cloud server 106 to invoke API(s) of one or more of the non-edge cloud servers 102A-102I.

There may be a large number of users who are partaking in the same customer journey in the geographical location, which may require the edge cloud server 106 to make the API invocation(s) for each of the customer journeys. If the customer journey satisfies predefined criteria indicating that the customer journey is occurring very frequently, then the customer journey may be identified as trending in the geographical location. When a customer journey is trending, and to reduce high-latency communications with non-edge cloud servers 102A-102I due to lengthy distances between the servers, the API invocation(s) mapped to the trending customer journey may be cached at the edge-cloud server 106.

For example, the communications between the client and the edge cloud server 106 that occur for each customer journey step in the trending customer journey may be analyzed to determine which corresponding API calls are invoked at each communication of the trending customer journey. In other words, the customer journey steps of the trending customer journey are mapped to corresponding API invocations required to complete the customer journey. Once the customer journey steps have been mapped to their corresponding API invocations, a sequence of the API invocations for the tending customer journey may be generated in an order associated with the sequence of customer journey steps of the trending customer journey. The sequence of API invocations may then be cached at the edge cloud server 106 to provide better response times from the edge cloud server 106 for future users in the geographical location who partake in the trending customer journey. In one embodiment, the sequence of API invocations may be application program module/code that is replicated to a main memory of the edge cloud server 106. The application program module/code may be machine level code that is ready to execute and not necessarily a pre-compilation human level code library.

In some embodiments, one or more of the API invocations may be chained before they are cached at the edge cloud server 106. For example, an API chain may allow for a series of API calls to be passed and processed using one request/response. To illustrate, if an API call for a user login requires authentication tokens, an initial request can retrieve a token that is then passed along to headers of subsequent API requests to authenticate a user for access to data.

In some embodiments, one or more of the API invocations may be bundled before they are cached at the edge cloud server 106. An API bundle may be a grouping of API invocations such as through a single module and in a particular sequence so as to correspond to their order of invocation in a customer journey. In one case, several API requests can be packaged together to be sent at one time but remain individual API requests, which can reduce the number of back and forth communications (e.g., round trip delays) between the edge cloud server 106 and non-edge cloud servers 102A-102I. In another case, several API requests can be consolidated into a single API request, which could also reduce the number of back and forth communications between the edge cloud server 106 and non-edge cloud servers 102A-102I

Figure 2:
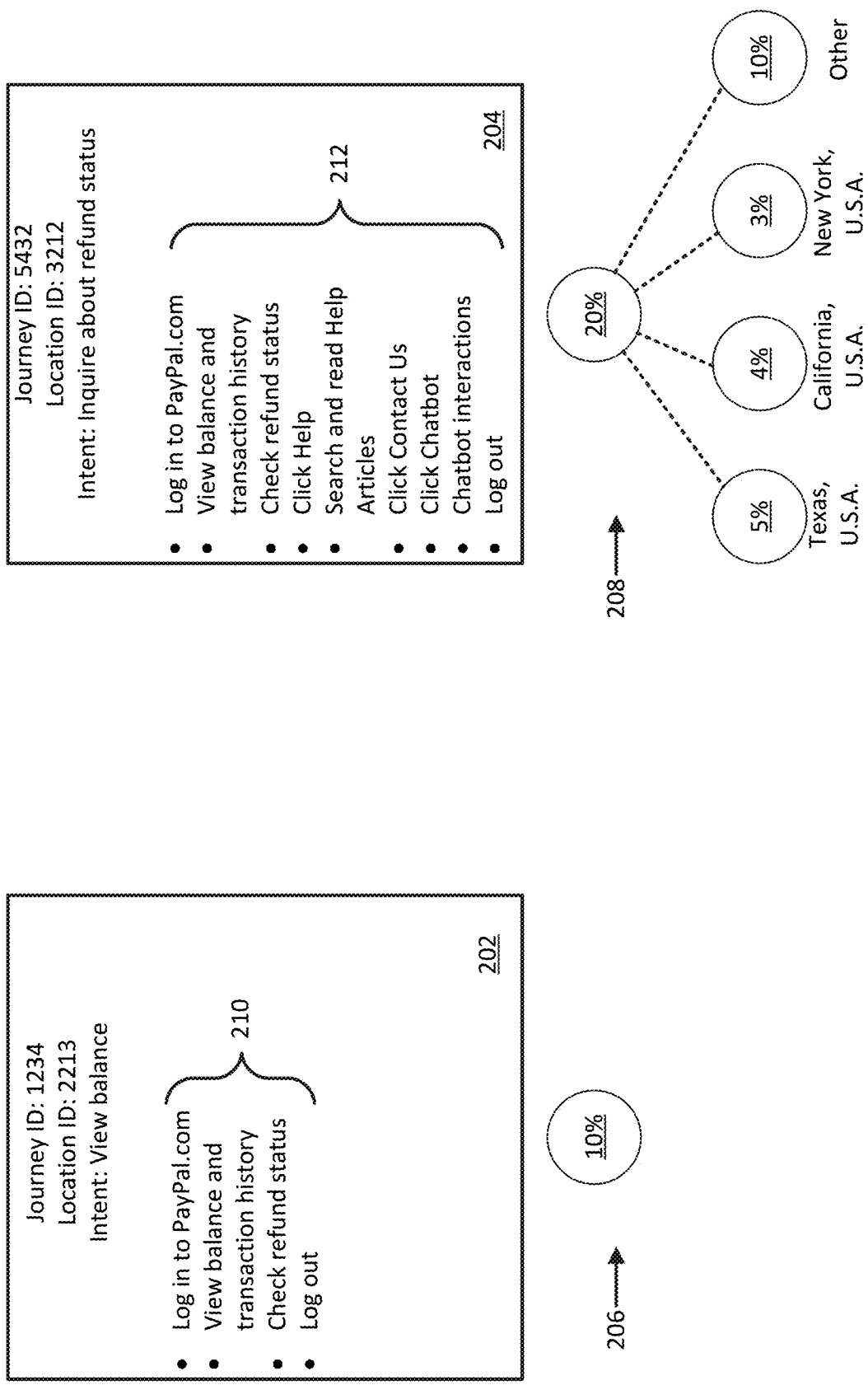
FIG. 2 illustrates example customer journeys in accordance with one or more embodiments of the present disclosure.

Referring now to FIG. 2, illustrated are example customer journeys 202 and 204. Customer journeys 202 and 204 may include individual user action steps that users perform while they visit a website or interact with an application (e.g., an application executing on a client device and/or an application executing in the cloud as a service). In some embodiments, the individual user action steps may be referred to as customer journey steps. As shown in FIG. 2, in customer journey 202, the individual user action steps may include steps 210, which are example user action steps that a user performs when following customer journey 202.

Steps 210 for customer journey 202 may be determined based on aggregated user data and patterns that have been identified as existing in the aggregated data. For example, in some embodiments, when a user visits a website, the application executing at the user's client device and/or a service provider server (e.g., edge cloud server 106 or a server of data center 104) may monitor individual user action steps taken by the user. A user intent (e.g., the subject matter of a customer journey) may be determined based on the individual user action steps taken by the user (e.g., certain user actions may correlate to a high degree to a certain user intent). Over a large amount of data aggregated for user action steps taken by users, patterns recognized in the user action steps and their matching user intents can be used to define customer journeys such as customer journey 202 and 204. In some embodiments discussed herein, aggregating the data to define customer journeys as well as the aggregated data itself may be referred to as customer journey insights.

Customer journey 202 and customer journey 204 may be identified by using a unique identifier. For example, as shown in FIG. 2, customer journey 202 has an identifier of "1234" and customer journey 204 has an identifier of "5432." Customer journey identifiers help to distinguish each customer journey from the plurality of customer journeys that are possible and that have been identified/created based on the patterns recognized from the aggregated user data.

As shown in FIG. 2, customer journey 202 has a location identifier "2213" and customer journey 204 has a location identifier "3212." A location identifier may correspond to a geographical location in which a user partakes in a customer journey. As an example, location identifier "2213" may correspond to a geographical location such as the state of Washington in the U.S.A. The granularity of geographical locations may be modified to suit a desired application. For example, geographical locations can correspond to a city, county, state, country, continent, and so forth. In some cases, geographical locations may include a region defined by a deliberate geofence (e.g., drawn according to rules or manually drawn).

In some embodiments, the location identifier may assist in identifying an edge cloud server to which a user device is assigned to communicate during the execution of an application on the user device and/or the edge cloud server (e.g., edge cloud server 106 of FIG. 1B). For example, where there are a number of edge cloud nodes spread across a service location, each edge cloud node can be designated to service particular locations of the total service location, and user devices within those particular locations will be assigned to communicate with the edge cloud node designated to the particular location.

Customer journey insights may be tracked for each geographical location, and statistics regarding customer journeys may be determined, monitored, and updated/refreshed to improve computing at the edge cloud server as further described in the present disclosure.

Diagram 206 of FIG. 2 indicates that customer journey 202, having the identifier "1234," may be observed to occur 10% of the time for customer journeys in a location corresponding to location identifier "2213." The time period over which this statistic can be monitored may be adjustable. For example, a shorter time period may allow the occurrence rate to be tracked at or near real-time such that dynamic caching at an edge cloud server servicing the location can be performed, which moves computing closer to the user device in that location for immediate use for customer journeys that appear to be happening frequently (e.g., trending). Continuously monitoring customer activity to extrapolate customer journey insights and dynamically caching closer to the population of users of the location where a customer journey is frequently occurring to mirror the interaction patterns of the population of users in that location can provide significant improvements to computing response times. The following is an example of how dynamic caching to mirror customer user activity may operate. In response to a trending customer journey in a geographical location, an edge cloud server servicing the geographical location may cache an API chain and/or API bundle to reduce response times in communications associated with users in the geographical location following the customer journey of the trend. The caching is dynamic because, for example, in a following hour, the edge cloud server may cache another API chain and/or bundle to mirror a change of trend detected in customer journeys of users in the geographical location.

Diagram 208 of FIG. 2 indicates that customer journey 204, having the identifier "5432," may be observed as occurring 20% of the time for customer journeys in a location corresponding to location identifier "3212." The location corresponding to location identifier "3212" may encompass several sub-locations. Each sub-location may have an occurrence rate of customer journeys identified by customer journey identifier "5432." As an illustration, customer journey 204 may have an occurrence rate of 20% in North America such that of the observed customer journeys that are occurring in North America, 20% of the time, customer journey 204 occurs. The occurrence rate may be tracked by sub-locations according to a desired granularity. For example, a customer journey identified by customer journey identifier "5432" may have an occurrence rate of 5% in Texas, 4% in California, 3% in New York, and 10% in another sub-location of North America. Each location may have its own criteria for determining whether a customer journey is trending. For example, in Texas, to be trending, a customer journey must exceed a threshold of a 4% occurrence rate. Whereas in California, to be trending, a customer journey must exceed a threshold of a 6% occurrence rate. In some embodiments, the time period over which an occurrence rate of a customer journey must be sustained over the threshold before it is deemed trending may vary from location to location.

Figure 3:
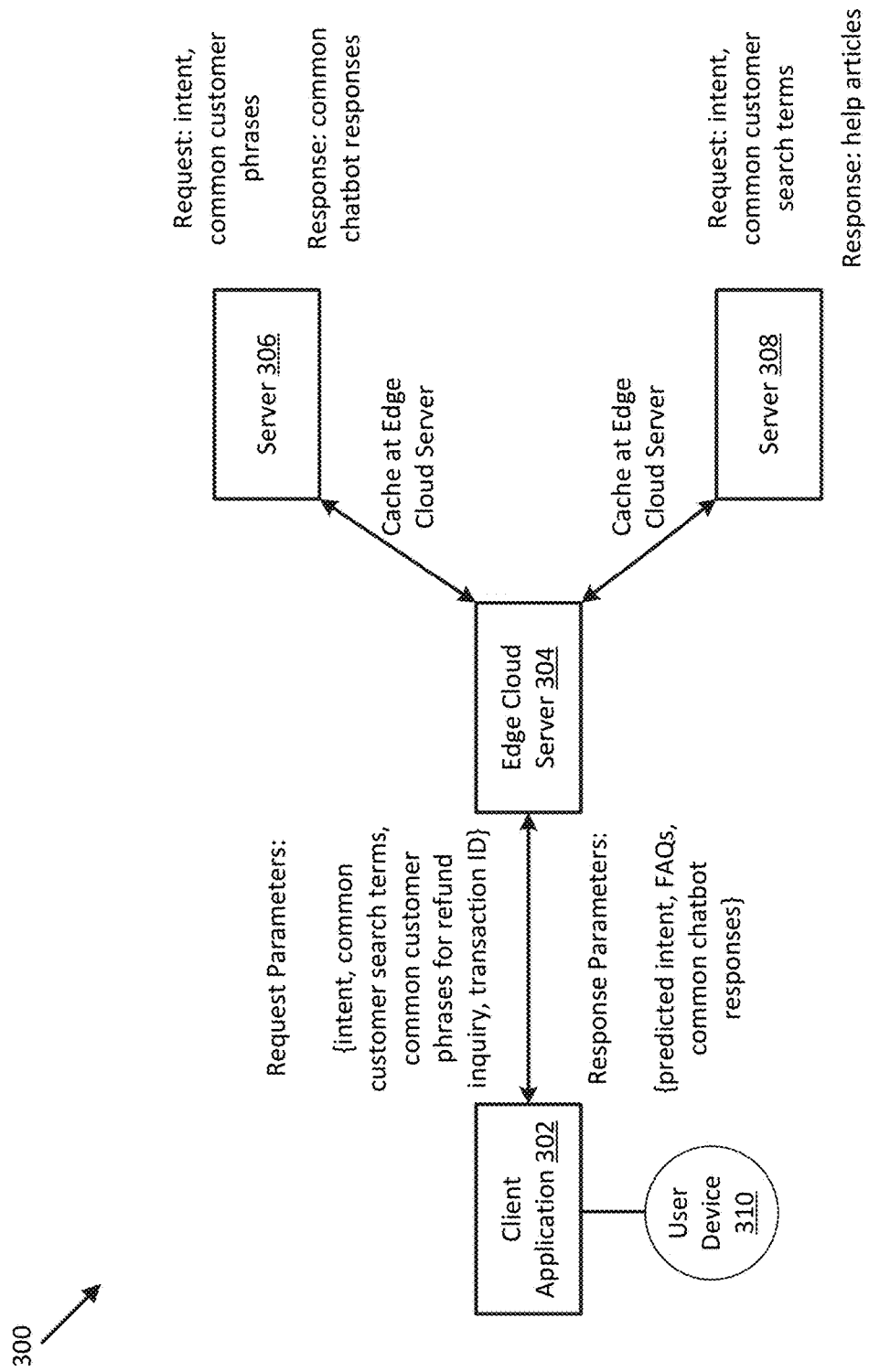
FIG. 3 illustrates a system environment for edge cloud computing in accordance with one or more embodiments of the present disclosure.

FIG. 3 illustrates a system environment 300 that includes a client application 302, an edge cloud server 304, servers 306 and 308, and a user device 310. In various embodiments, client application 302 may be executing on user device 310, at edge cloud server 304, or in a hybrid fashion in which certain components of client application 302 execute on user device 310 and other components of client application 302 execute on edge cloud server 304. In some embodiments, the edge cloud server 304 may be, may be part of, or may include the edge cloud server 106 of FIG. 1B.

In some embodiments, servers 306 and 308 may provide services/functionality to the edge cloud server 304. For example, server 306 may correspond to a chat bot service provider, and server 308 may correspond to a customer help content service provider. Servers 306 and 308 may have APIs configured to send and receive communications to and from edge cloud server 304. For example, servers 306 and 308 may receive requests from edge cloud server 304 and provide a response to edge cloud server 304, which allows edge cloud server 304 to then provide an appropriate response for client application 302. According to various embodiments, a request may include one or more parameters that the APIs of servers 306 and 308 require for generating a response. Responses may be returned in various data formats. By non-limiting example, responses may include XML, JSON, or other types of files that would be readily implementable in an API configuration.

In one use case, based on identified customer journey trends, certain API outputs/responses from servers 306 and 308 may be cached at edge cloud server 304. For example, a customer journey trend may indicate that a certain customer journey is frequently occurring in a specific geographical location. The customer journey trend may include communications between edge cloud server 304 and client application 302 or servers 306 and 308 that are caused by the individual user action steps taken in association with client application 302. For example, user action steps can be taken by customers using client application 302 or agents acting on behalf of an organization that manages client application 302.

According to one embodiment, based on a customer journey trend where user action steps related to an intent of "inquiring about a refund" may cause an output in a chat bot application at client application 302, common chat bot responses for an intent of "inquiring about a refund" can be retrieved from server 306 and cached at edge cloud server 304. Similarly, based on the same customer journey trend or another customer journey trend where user actions steps related to a refund inquiry cause an output of customer help content (e.g., help articles) at client application 302, help article responses associated with refund inquiries may be retrieved from server 308 and cached at edge cloud server 304.

By dynamically caching responses that correspond to real-time customer journey trends, a cache at edge cloud server 304 can be up-to-date with immediately needed resources in response to a current trend, which will reduce the number of communications needed between edge cloud server 304 and servers 306 and 308. Thus, latency from the communications can be avoided, which provides for faster compute response times in using client application 302. As an illustration, during execution of client application 302, client application 302 may make a service request (e.g., API invocation, function invocation, etc.) to edge cloud server 304. Since responses from server 306 and 308 have been cached at edge cloud server 304 (e.g., in response to a trend being identified in a location corresponding to where client application 302 is being executed), responses to service requests can be generated quickly at the edge cloud server 304 without invocation of functions provided by servers 306 and 308 or at least some communications can be avoided.

Figure 4:
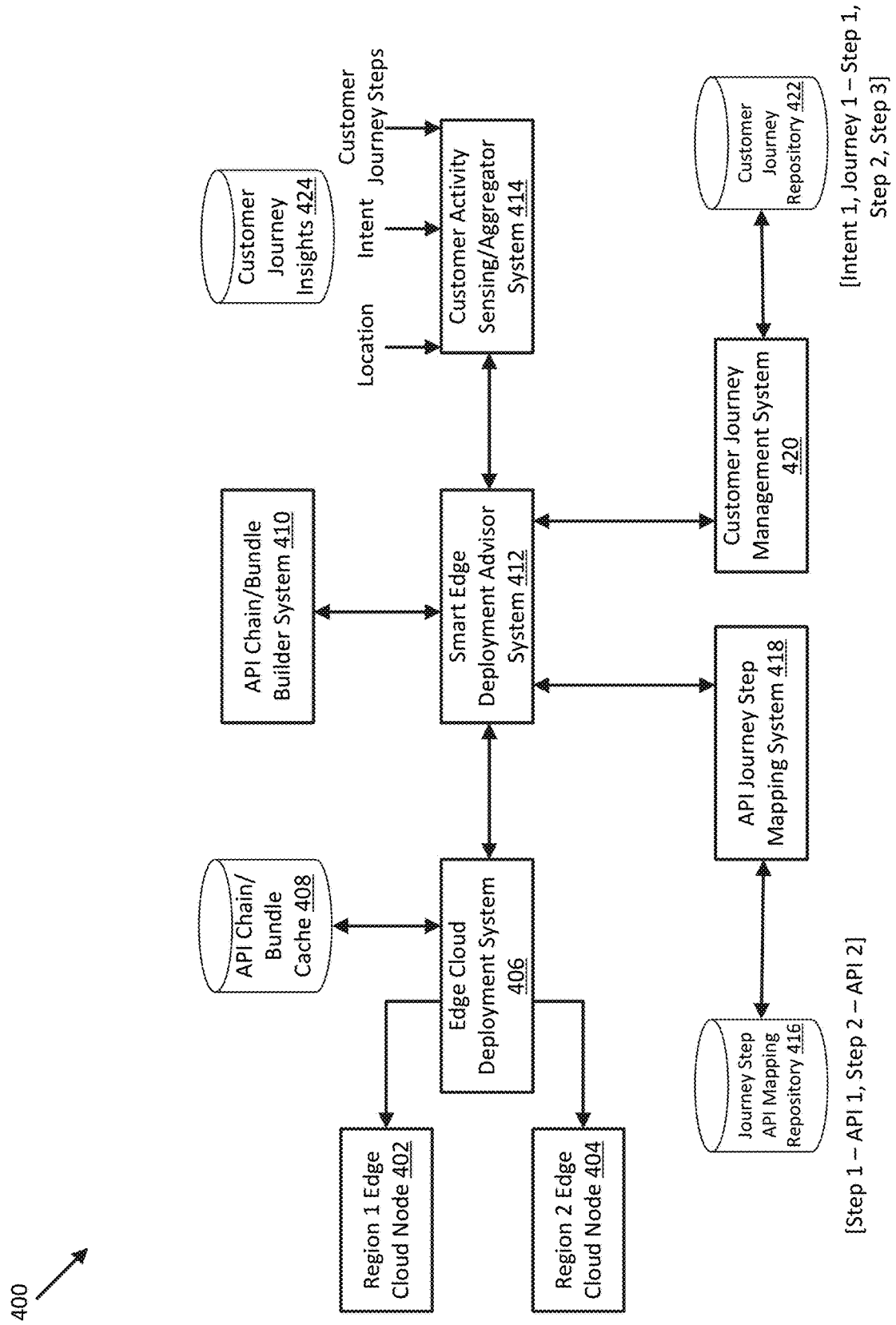
FIG. 4 illustrates a system suitable for smart cloud caching using edge computing and real-time customer journey insights in accordance with one or more embodiments of the present disclosure.

FIG. 4 illustrates a system 400 suitable for smart cloud caching in edge computing based on real-time customer journey insights in accordance with one or more embodiments of the present disclosure. Variations in the arrangement and type of the components may be made without departing from the spirit or scope of the claims as set forth herein. Additional components, different components, and/or fewer components may be provided.

System 400 includes a region 1 edge cloud node 402, a region 2 edge cloud node 404, an edge cloud deployment system 406, an API chain/bundle cache 408, an API chain/bundle builder system 410, a smart edge deployment advisor system 412, a customer activity sensing/aggregator system 414, a journey step API mapping repository 416, an API journey step mapping system 418, a customer journey management system 420, and a customer journey repository 422.

In an embodiment, customer activity sensing/aggregator system 414 may monitor and aggregate customer activity data (e.g., user activity data, client activity data, agent activity data) including which individual user action steps were taken, what the user intent was in a user session, and which location the user is operating from. Based on the aggregated customer activity data, customer journey insights 424 can be generated, which include statistics used to help identify patterns in the customer activity data.

Smart edge deployment advisor system 412 may poll customer activity sensing/aggregator system 414 (e.g., periodically) to obtain customer activity data to determine customer journey trends. For example, smart edge deployment advisor system 412 may request customer activity data from customer activity sensing/aggregator system 414 pertaining to certain location(s), intent(s), and/or customer journey steps. Based on the aggregated customer activity data, smart edge deployment advisor system 412 may identify patterns in the customer activity data that can be used to determine trends in customer journeys across different geographical locations.

By way of example, referring to FIG. 2, one trend may be that customer journey 202 is occurring 10% of the time for customer journeys in a location corresponding to location identifier "2213." If the 10% occurrence rate satisfies criteria (e.g., exceeding a predefined occurrence threshold, sustaining the occurrence rate over the occurrence threshold for a predefined time period, etc.), customer journey 202 can be designated as trending in that location.

As another example, customer journey 204 may be determined to be occurring 20% of the time for customer journeys in a location corresponding to location identifier "3212." In this example, the 20% occurrence rate may fail to satisfy criteria indicating that customer journey 204 is trending in the location corresponding to location identifier "3212." In some embodiments, the criteria for some locations may be different than others. For example, locations of higher order may have more stringent criteria than sub-locations or locations of lower order, and vice versa.

As a further example, in a sub-location to the location corresponding to identifier "3212," such as California in diagram 208, a 4% occurrence rate of a customer journey having the same customer journey identifier "5432" of customer journey 204, but a different location identifier (not shown in FIG. 2), may be sufficient to satisfy criteria for the California location to designate the customer journey as trending in California.

Referring back to FIG. 4, smart edge deployment advisor system 414 may invoke customer journey management system 420 to update customer journey variations in customer journey repository 422. In some cases, there may be customer journey variations where customer journey repository 422 needs to be updated as variations in customer journeys may occur due to changes in user behavior. For example, when there is an update to a user interface or functionality of a client application, a user's behavior and interactions with the client application could change, which could affect the customer journey steps of an existing customer journey. Thus, the customer journey steps of the existing customer journey may be updated to reflect the different customer journey steps that a user takes on the customer journey.

In other cases, smart edge deployment advisor system 412 may recognize new customer journeys based on patterns identified in the aggregated customer journey data from customer activity sensing/aggregator system 414. For example, a pattern of user action steps followed by many users can be determined to highly correlate to a user intent. Yet, such steps and user intent may not be mapped to an existing customer journey. Thus, in such cases, a new customer journey may be created and associated with the user action steps and user intent.

Smart edge deployment advisor system 414 may further request a sequence of steps for a customer journey from customer journey management system 420. In one embodiment, the customer journey management system 420 may respond to the smart edge deployment advisor system 414 by providing a unique ID attribute and step name attribute to the smart edge deployment advisor system 414 for each of the steps in the customer journey. Using the unique ID attribute and step name attribute, the smart edge deployment advisor system 414 may perform a bulk inquiry operation to get associated APIs for each step by invoking API journey step mapping system 418.

Smart edge deployment advisor system 412 may invoke API journey step mapping system 418 to retrieve API invocations associated with customer journey steps of customer journeys (e.g., an API ID, API name, modules, executable code, related parameters and so forth configured for sending and receiving API requests and responses). API journey step mapping system 418 may map API invocations needed for each customer journey for each location. For example, smart edge deployment advisor system 412 may provide API journey step mapping system 418 with a customer journey identifier, unique ID attribute for a step, and/or step name attribute, and API journey step mapping system 418 may fetch/return API invocations corresponding to a customer journey and its corresponding customer journey steps. API journey step mapping system 418 may evaluate each of the customer journey steps to determine which API invocations are required when a user is following the customer journey. API journey step mapping system 418 may generate a sequence of API invocations in an order corresponding to the customer journey steps and then return the generated sequence to smart edge deployment advisor system 412.

Smart edge deployment advisor system 412 may invoke API chain/bundle builder system 410 to build API chains and bundles based on the API invocation to customer journey step mapping received from API journey step mapping system 418. For example, the smart edge deployment advisor system 412 may provide API IDs, API names to API chain/bundle builder system 410 so that API chain/bundle builder system can generate modules and/or executable code that can be cached.

In some embodiments, an API chain may include machine-readable code that is executable to cause an API response corresponding to a first API request to input as a parameter to a second API request. It will be appreciated that the API chain length can be more than two API invocations. The API chain may correspond to the sequence of API invocations mapped to customer journey steps generated by API journey step mapping system 418, or a subset of the API invocations in the sequence. For example, the sequence of API invocations may include a number of API invocations that can be chained and a number of API invocations that are bundled together or non-bundled but grouped together.

The following is an example of API chaining. A user may be following a customer journey in which the user creates a ticket to dispute a transaction. A first API request may be used to retrieve historic transactions that the user has conducted and from which the user can select the transaction to dispute. A second API request may be used to submit the ticket with the selected transaction. Thus, the transaction information obtained as a response from the first API request can be chained to the second API request as a parameter in the ticket submission.

The following is another example of API chaining. Suppose for a customer journey having an intent of refund inquiry, there are three steps needed to be performed to respond: retrieving recent transactions, predicting disputed transaction, and caching a refund status. Each of the three steps may have associated API(s) that are called to perform the steps. Without API chaining, a cache may be queried for each cached API step response. However, by chaining the API invocations, the refund status of the predicted transaction can be obtained in a single query to the cache rather than needing three different queries to the cache for each step.

In various embodiments, an API bundle may be a grouping of API invocations such as through a single module and in a particular sequence so as to correspond to their order of invocation in a customer journey. In one example, several API requests can be packaged together to be sent at one time but remain individual API requests. In another example, several API requests can be consolidated into a single API request. API chain/bundle builder system 410 may build API chains and bundles and categorize them by location identifier, intent, and customer journey steps for storage in API chain/bundle cache 408. The categorized API chains and bundles stored in API chain/bundle cache 408 can be made available for deployment (e.g., replication) at individual edge cloud nodes.

Smart edge deployment advisor system 412 may provide instructions to edge cloud deployment system 406 for replicating API chains and/or bundles from API chain/bundle cache 408 at specific edge cloud nodes servicing locations in which a trend of customer journeys has been identified. In some embodiments, replication may include replication application program module/code to a main memory of the edge cloud node, which may be machine level code that is ready to execute and not necessarily a pre-compilation human level code library.

For example, after determining that a first customer journey trend is pervasive in a first location that region 1 edge cloud node 402 services based on a satisfaction of a predefined criteria indicating the pervasiveness of the first customer journey trend in the first location, smart edge deployment advisor system 412 may provide instructions to edge cloud deployment system 406 to replicate one or more API chains and/or bundles to region 1 edge cloud node 402.

Similarly, after determining that a second customer journey trend is pervasive in a second location that region 2 edge cloud node 404 services based on a satisfaction of a predefined criteria indicating the pervasiveness of the second customer journey trend in the second location, smart edge deployment advisor system 412 may provide instructions to edge cloud deployment system 406 to replicate one or more API chains and/or bundles to region 2 edge cloud node 404.

In some cases, the first customer journey trend and the second customer journey trend may consist of the same customer journey, in which case the API chains and/or bundles replicated at the region 1 and region 2 edge cloud nodes 402 and 404 may be the same. In other cases, the first customer journey trend and the second customer journey trend may consist of different customer journeys, in which case the API chains and/or bundles replicated at the region 1 and region 2 edge cloud nodes 402 and 404 in response to such trends may be different.

In response to receiving the instructions from smart edge deployment system 412, edge cloud deployment system 406 may collect cached API chains/bundles from API chain/bundle cache 408 and replicate them at the specific regional edge cloud nodes such as region 1 edge cloud node 402 and region 2 edge cloud node 404.

In some embodiments, after replication at an edge cloud node, when users are interacting with the client application, a prediction at the edge cloud node can be made as to whether the user will follow the customer journey steps corresponding to a trend in the location based on the user's device geolocation (e.g., a retrieved GPS location from the client device) indicating that the client device is within the location and/or user action steps that the user has started to complete in the customer journey that is trending. The prediction may allow the edge cloud node to execute a cached sequence of one or more API invocations (e.g., the API chains and/or bundles that were replicated at the edge cloud node) prior to the customer journey steps being completed by the user, which could provide for quicker response times in the use of client application as resources can be collected and delivered prior to the user taking the steps of the customer journey or near real-time due to less communications that have to occur between the edge cloud node and other non-edge cloud node servers.

Figure 5:
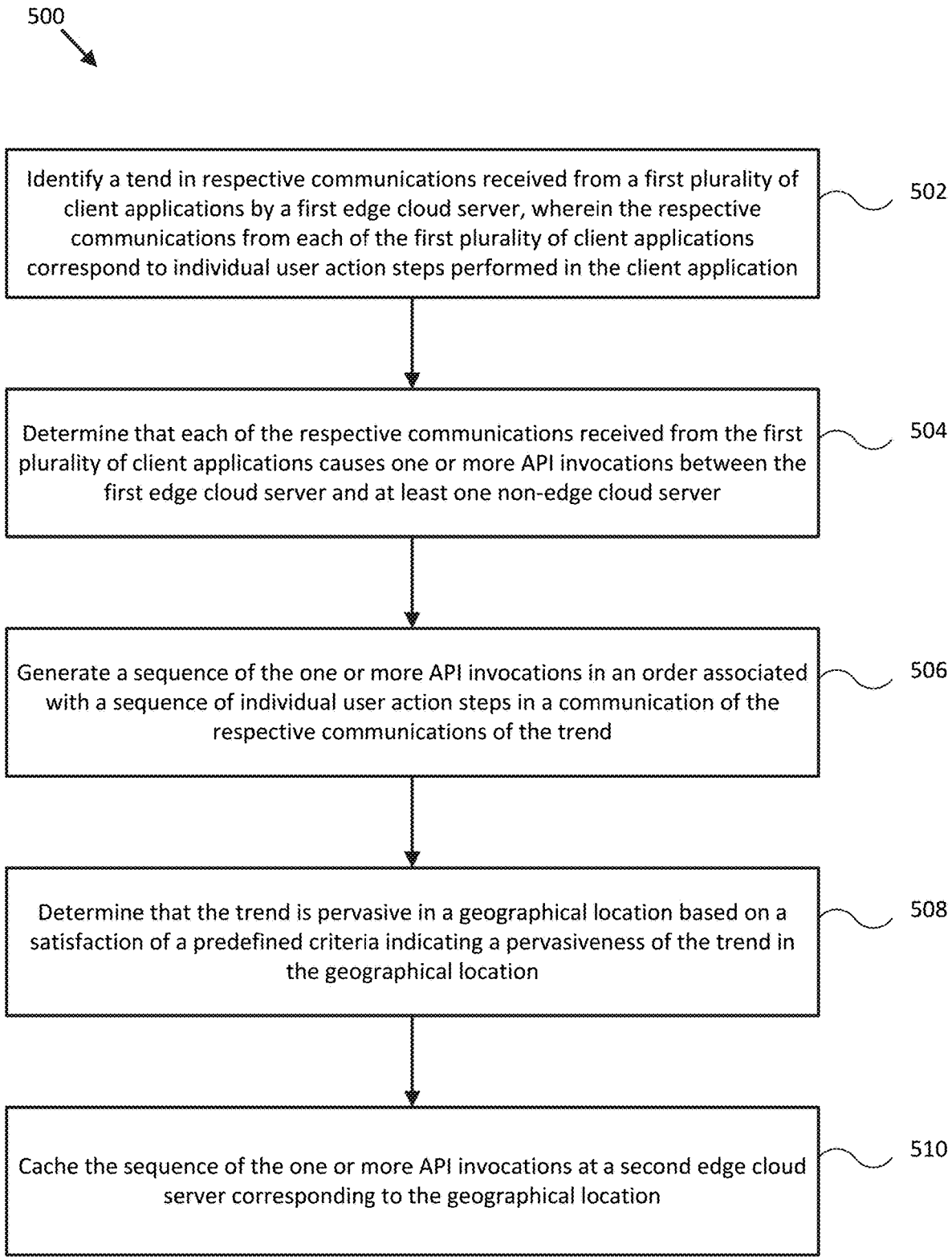
FIG. 5 illustrates a flow diagram of a process for smart cloud caching using edge computing and real-time customer journey insights in accordance with one or more embodiments of the present disclosure.

Referring now to FIG. 5, illustrated is a flow diagram of a process 500 for smart cloud caching using edge compute and real-time customer journey insights in accordance with one or more embodiments of the present disclosure. The blocks of process 500 are described herein as occurring in serial, or linearly (e.g., one after another). However, multiple blocks of process 500 may occur in parallel. In addition, the blocks of process 500 need not be performed in the order shown and/or one or more of the blocks of process 500 need not be performed. It is noted that several of the steps and sub-steps in the blocks of process 500 may be described in reference to the additional figures of the present disclosure. In some embodiments, process 500 may be performed by a computer system comprising a non-transitory memory storing instructions and at least one hardware processors configured to execute the instructions. In various embodiments, a non-transitory machine-readable medium may have instructions stored thereon which are executable to cause a machine to perform process 500. In various embodiments, several of the blocks of process 500 may be performed by system 400 of FIG. 4.

At block 502, the system may identify a trend in respective communications received from a first plurality of client applications by a first edge cloud server, wherein the respective communications from each of the first plurality of client applications correspond to individual user action steps performed in the client application. As an example, steps 210 and 212 of FIG. 2 may include individual user action steps (e.g., customer journey steps) that cause communications between a client application and the first edge cloud server during a customer journey. It is noted that the respective communications may include sending and receiving data between the client application and the first edge cloud server so that the client application can execute functions and render properly when a user is following a customer journey. It is further noted that a user can follow more than one customer journey during the respective communication session between the client application, or user device running the client application, and the first edge cloud server.

Referring back to FIG. 5, at block 504, the system may determine that each of the respective communications received from the first plurality of client applications causes one or more service invocations between the first edge cloud server and at least one non-edge cloud server. For example, referring again to FIG. 2, in a communication in which customer journey 204 occurs, the individual user action step "Search and read Help Articles" may cause the first edge cloud server to invoke a service provided by a non-edge cloud server. Referring to FIG. 3, as an example, edge cloud server 304 may invoke a service from server 308 to provide help articles for the user. The service may be invoked through an API request/response model or other service functionality available to edge cloud server 304.

As another example, referring to FIG. 2, in a communication session in which customer journey 204 occurs, the individual user action step "Click Chatbot" may cause the first edge cloud server to invoke a service provided by a non-edge cloud server. For example, referring again to FIG. 3, edge cloud server 304 may invoke a function provided by server 306 to provide chat bot services in response to a user activating the "Chatbot."

Referring back to FIG. 5, at block 506, the system may generate a sequence of the one or more service invocations in an order associated with a sequence of the individual user action steps in a communication session (e.g., customer journey) of the respective communications of the trend. For example, the system may map the individual user action steps in the customer journey to API invocations that the steps cause. Based on the mapping, the sequence can be generated in an appropriate order that coincides with the customer journey.

In some embodiments, generating the sequence of the one or more service invocations may include chaining at least two API invocations. For example, chaining may include generating machine-readable code or a module executable to cause an API response corresponding to a first API request to input as a parameter to a second API request and so forth until the desired API invocations have been chained together. As an illustrative use case, a user may be following a customer journey in which the user creates a ticket to dispute a transaction. A first API request may be used to retrieve historic transactions that the user has conducted and from which the user can select the transaction to dispute. A second API request may be used to submit the ticket with the selected transaction. Thus, the transaction information obtained as a response from the first API request can be chained to the second API request as a parameter in the ticket submission.

In various embodiments, generating the sequence of the one or more service invocations may include bundling API invocations. For example, bundling API invocations may include generating machine-readable code or a module executable to cause execution of the API invocations in a consolidated manner. For example, instead of sending one API request at a time, the API bundle may include a plurality of API requests that get delivered together. In some cases, the plurality of requests can be bundled into a fewer requests. By reducing the number of requests that are sent, greater compute efficiencies can be achieved for the client application.

At block 508, the system may determine that the trend is pervasive in a geographical location based on a satisfaction of a predefined criteria indicating a pervasiveness of the trend in the geographical location. In some embodiments, the predefined criteria may include an occurrence rate. In one embodiment, an occurrence rate may be defined as the number of times that a type of customer journey identified by a unique identifier has occurred out of all the customer journeys that occurred for the geographical location over a period (e.g., past week, past day, past hour, past amount minutes etc.).

At block 510, the system may cache the sequence of the one or more service invocations at a second edge cloud server corresponding to the geographical location determined at block 508. In some embodiments, the system may determine if the trend is pervasive in any other geographical locations, and cache the sequence of the one or more service invocations at the edge cloud server(s) corresponding to the other geographical locations as well. As such, edge cloud servers near users in a geographical location in which there is a trending customer journey will have cached resources that mirror the real-time customer activity for the geographical location.

Thus, after the caching has been performed at the second edge cloud server, when the second edge cloud server receives communications from another client application executed by a device in the location where a customer journey is trending, the second edge cloud server may predict that the user of the client application will follow the customer journey trend. For example, the second edge cloud server may determine that a subset of individual user action steps corresponding to the trending customer journey have been performed in the client application executing by the device in the location where the customer journey is trending. Based on the subset of individual user action steps having been performed, it can be predicted that the user will complete the individual user action steps that remain uncompleted. Based on the prediction, the second edge cloud server may perform anticipatory tasks such as executing the cached service invocations beforehand and delivering resources for prepopulating in the client application to reduce response times for the client application.

Thus, the present disclosure provides dynamic edge cloud server caching techniques to improve compute efficiencies.

A workload for a user device executing a client application can be reduced by caching API chains and bundles at edge cloud servers. Caching at the edge cloud servers based on current customer journey insights can reduce unnecessary communications that cause latencies, which provides for improved response times for a client application and a better user experience.

Figure 6:
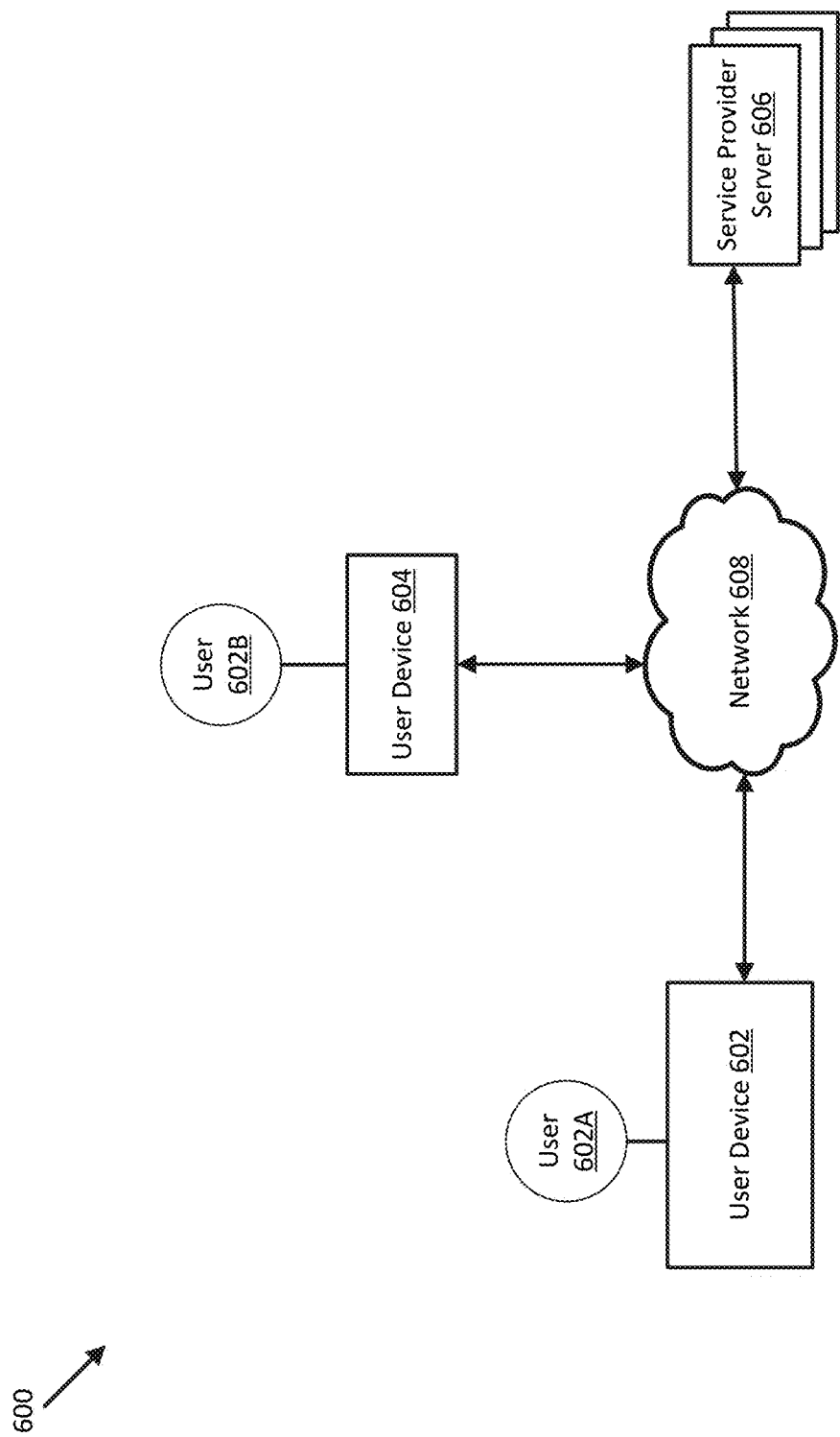
FIG. 6 illustrates a block diagram of a networked system suitable for implementing one or more embodiments of the present disclosure.

Referring now to FIG. 6, a block diagram of a networked system 600 configured smart cloud caching using edge compute and real-time customer journey insights in accordance with one or more embodiments of the present disclosure is illustrated. System 600 includes user devices 602 and 604 and service provider server(s) 606. A user 602A is associated with user device 602, where user 602A can provide an input to service provider server 606 using user device 602.

User device 602 and service provider server 606 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 600, and/or accessible over a network 608. Each of the memories may be non-transitory memory. Network 608 may be implemented as a single network or a combination of multiple networks. For example, in various embodiments, network 608 may include the Internet or one or more intranets, landline networks, and/or other appropriate types of networks.

User device 602 may be implemented using any appropriate hardware and software configured for wired and/or wireless communication over network 608. For example, in some embodiments, user device 602 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 602 may include one or more browser applications which may enable the user device 602 to various web applications provided by service provider server(s) 606 over network 608. User device 602 may also include one or more toolbar applications which may be used, for example, to provide client-side processing for performing desired tasks in response to operations selected by user 602A. In one embodiment, the toolbar application may display a user interface in connection with the browser application.

User device 602 may further include other applications as may be desired in particular embodiments to provide desired features to user device 602. For example, the other applications may include an application to interface between service provider server 606 and the network 608, security applications for implementing client-side security features, programming client applications for interfacing with appropriate application programming interfaces (APIs) over network 608, or other types of applications. In some cases, the APIs may correspond to service provider server 606. The applications may also include email, texting, voice, and instant messaging applications that allow user 602A to send and receive emails, calls, and texts through network 608, as well as applications that enable the user to communicate to service provider server 606 as discussed above. User device 602 includes one or more device identifiers which may be implemented, for example, as operating system registry entries, cookies associated with the browser application, identifiers associated with hardware of user device 602, or other appropriate identifiers, such as those used for user, payment, device location, and or authentication. In some embodiments, a device identifier may be used by service provider server 606 to associate user 602A with a particular account maintained by the service provider server 606. A communications application with associated interfaces facilitates communication between user device 602 and other components within system 600. User device 604 may be similar to user device 602.

Service provider server 606 may be maintained, for example, by an online cloud service provider. In this regard, service provider server 606 includes one or more applications which may be configured to interact with user device 602 and user device 604 over network 608 to facilitate the provision of client application functionality as discussed in the present disclosure. Service provider server 606 maintains a plurality of user accounts (e.g., stored in a user account database accessible by service provider server 606), each of which may include individual user data and preferences.

Figure 7:
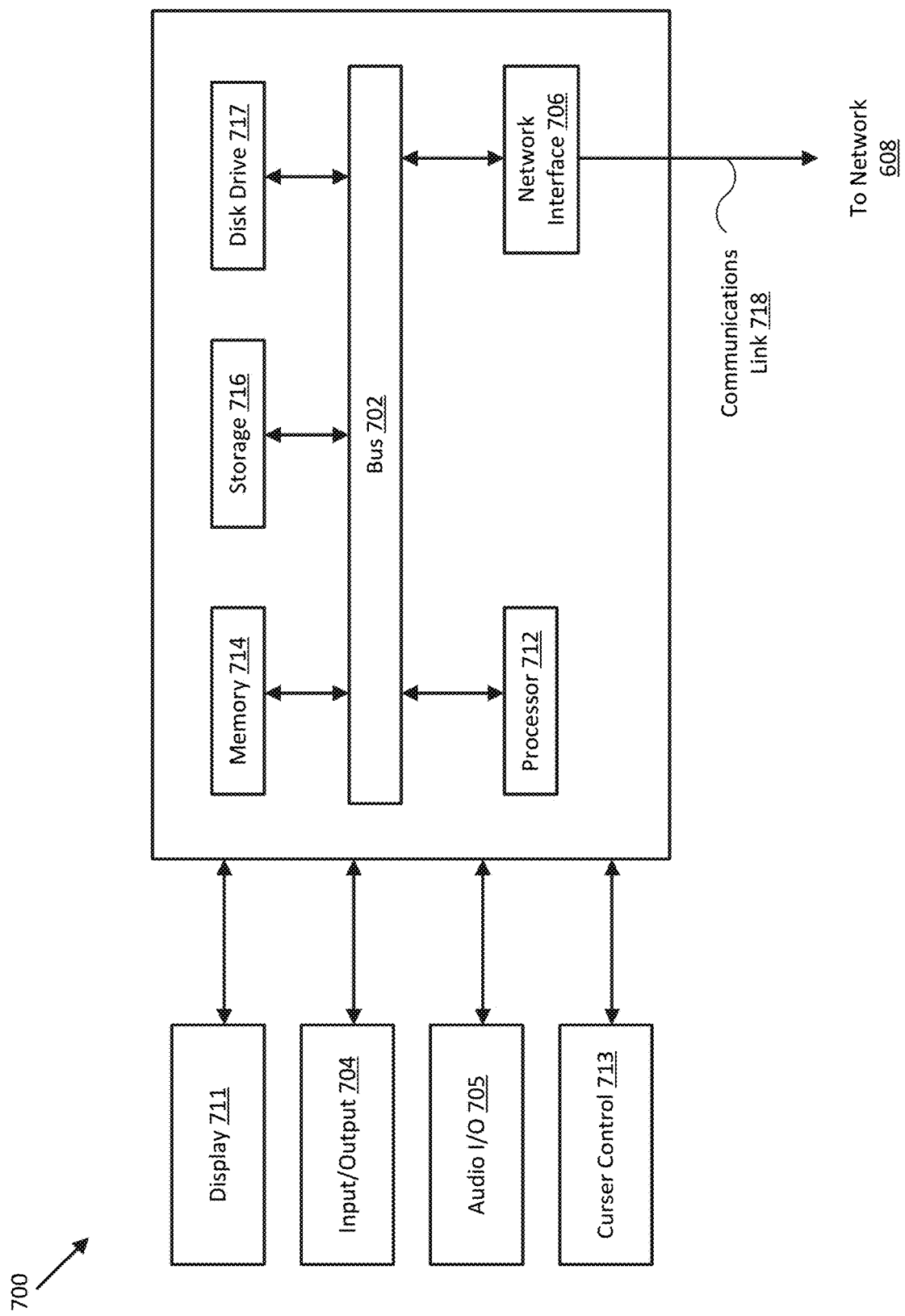
FIG. 7 illustrates a block diagram of a computer system in accordance with one or more embodiments of the present disclosure.

FIG. 7 illustrates a block diagram of a computer system 700 suitable for implementing one or more embodiments of the present disclosure. In various implementations, the computer system 700 may comprise a personal computing device (e.g., a personal computer, laptop, smart phone, PDA, Bluetooth device, key FOB, badge, wearable device such as a smart watch, smart TV, or any other visual accessibility capable device) and/or a server computing device. It should be appreciated that each of the devices utilized by users and service providers discussed herein may be implemented as computer system 700 in a manner as follows.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component, such as a display 711 and a cursor control 713 (such as a keyboard, keypad, mouse, etc.). I/O component 704 may further include NFC communication capabilities. An optional audio I/O component 705 may also be included to allow a user to use voice for inputting information by converting audio signals. Audio I/O component 705 may allow the user to hear audio such as audible descriptions provided by a screen reader application. A transceiver or network interface 706 transmits and receives signals between computer system 700 and other devices, such as another user device, an entity server, and/or a provider server via network 608. In one embodiment, the transmission is wireless, although other transmission mediums and methods may also be suitable. Processor 712, which may be one or more hardware processors, can be a micro-controller, digital signal processor (DSP), or other processing component, processes these various signals, such as for display on computer system 700 or transmission to other devices via a communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer-readable medium, which may refer to any medium that participates in providing instructions to processor 712 for execution. Such a medium may take many forms, including but not limited to, non-volatile media, volatile media, and transmission media. In various implementations, non-volatile media includes optical or magnetic disks, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network 608 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
a non-transitory memory storing instructions; and
one or more hardware processors configured to execute the instructions to cause the system to perform operations comprising:
identifying a trend in respective communications received from a first plurality of client applications by a first edge cloud server of the system, wherein the respective communications from each of the first plurality of client applications correspond to individual user action steps performed in the client application, and wherein each of the respective communications received from the first plurality of client applications causes one or more Application Programming Interface (API) invocations between the first edge cloud server and at least one non-edge cloud server;
determining a particular customer journey based on the trend, wherein the particular customer journey describes a particular sequence of user action steps, and wherein each user action step in the particular sequence of user action steps triggers an execution of a corresponding program within the system;
generating a sequence of API invocations in an order associated with the particular sequence of user action steps of the particular customer journey;
chaining the sequence of API invocations as an API chain, wherein the chaining the sequence of API invocations comprises linking a first parameter in a first API invocation in the sequence of API invocations to a second parameter in a second API invocation in the sequence of API invocations;
determining that the trend is pervasive in a geographical location based on a satisfaction of a predefined criteria indicating a pervasiveness of the trend in the geographical location; and
in response to the determining that the trend is pervasive in the geographical location, caching a query associated with the API chain at a second edge cloud server corresponding to the geographical location, wherein the query replaces the particular sequence of API invocations based on the API chain.

2. The system of claim 1, wherein the operations further comprise:
aggregating data associated with the respective communications received by the first edge cloud server from the first plurality of client applications, wherein the identifying the trend is based on the aggregated data.

3. The system of claim 1, wherein the first parameter corresponds to an output of the first API invocation, and wherein the second parameter corresponds to an input for the second API invocation.

4. The system of claim 1, wherein the operations further comprise:
predicting that a user of a client application will follow the particular customer journey based on a location of a client device of the user corresponding to the geographical location; and
causing the second edge cloud server to execute the cached query for the client application.

5. The system of claim 1, wherein the first edge cloud server comprises the second edge cloud server.

6. The system of claim 1, wherein the operations further comprise
  identifying a second trend in second respective communications received by the first edge cloud server;
  determining a second customer journey based on the second trend; and
  caching a second query associated with a second API chain at the second edge cloud server, wherein the second API chain is generated based on the second customer journey.

7. A method comprising:
  identifying a trend in respective communications received by a first edge cloud server of a system from a first plurality of client devices, wherein the respective communications from each of the first plurality of client devices correspond to individual user action steps in an application managed by the first edge cloud server, and wherein each of the respective communications from the first plurality of client devices cause one or more Application Programming Interface (API) invocations between the first edge cloud server and at least one non-edge cloud server;
  determining a particular customer journey based on the trend, wherein the particular customer journey describes a particular sequence of user action steps;
  generating a sequence of API invocations in an order associated with the particular sequence of user action steps of the particular customer journey;
  chaining the sequence of API invocations as an API chain, wherein the chaining the sequence of API invocations comprises linking a first parameter in a first API invocation in the sequence of API invocations to a second parameter in a second API invocation in the sequence of API invocations; and
  caching a query associated with the API chain in a system database, wherein the cached query is available for replication at one or more edge cloud servers.

8. The method of claim 7, further comprising:
  identifying a second edge cloud server that has received second respective communications, from a second plurality of client devices, that satisfy criteria indicating that the trend is pervasive in a geographical location in which the second plurality of client devices are assigned to communicate with the second edge cloud server based on respective locations of the second plurality of client devices; and
  replicating the query at the second edge cloud server.

9. The method of claim 8, wherein the criteria comprise a threshold number of communications, received from the second plurality of client devices, that have occurred over a predefined period, wherein each of the communications correspond to a completion of the individual user action steps.

10. The method of claim 8, further comprising:
  predicting that a user of a client device located in the geographical location will follow the particular customer journey based on user action steps taken by the user via the client device with the system; and
  causing the second edge cloud server to execute the cached API query in response to a request received from the application executing for the client device.

11. The method of claim 7, wherein the first parameter corresponds to an output of the first API invocation, and wherein the second parameters corresponds to an input of the second API invocation.

12. The method of claim 7, further comprising caching a response to at least one of the particular sequence of API invocations in the system database such that the response is available for replication at the one or more edge cloud servers.

13. The method of claim 7, further comprising:
  aggregating data associated with the respective communications received from the first plurality of client devices, wherein the identifying the trend is based on the aggregated data.

14. The method of claim 13, wherein the aggregating the data comprises tracking an intent of the individual user action steps corresponding to the respective communications from each of the first plurality of client devices.

15. A non-transitory machine-readable medium having instructions stored thereon, wherein the instructions are executable to cause a machine of a system to perform operations comprising:
  identifying a trend in respective communications received from a first plurality of client applications by a first edge cloud server of the system, wherein the respective communications from each of the first plurality of client applications correspond to individual user action steps taken within an application running at a cloud data center for a plurality of client devices, and wherein each of the respective communications from the first plurality of client applications causes one or more service invocations between the first edge cloud server and at least one non-edge cloud server;
  determining a particular customer journey based on the trend, wherein the particular customer journey describes a particular sequence of user action steps;
  generating a sequence of service invocations in an order associated with the particular sequence of user action steps of the particular customer journey;
  chaining the sequence of service invocations as a service chain, wherein the chaining the sequence of service invocations comprises linking a first parameter in a first service invocation in the sequence of service invocations to a second parameter in a second service invocation in the sequence of service invocations;
  determining that the trend is pervasive in a geographical location based on a satisfaction of a predefined criteria; and
  in response to the determining that the trend is pervasive in the geographical location, caching a query associated with the service chain at a second edge cloud server corresponding to the geographical location.

16. The non-transitory machine-readable medium of claim 15, wherein the first edge cloud server comprises a first set of server computers, and the second edge cloud server comprises a second set of server computers.

17. The non-transitory machine-readable medium of claim 16, wherein the operations further comprise caching at least one response to the query at the second edge cloud server, wherein the cached response includes at least one of: a chatbot response or a user help article.

18. The non-transitory machine-readable medium of claim 15, wherein the operations further comprise:
  aggregating client-server communication data associated with the respective communications received from the first plurality of client applications, wherein the client-server communication data comprises:
    for each respective communication between the first edge cloud server and the first plurality of client applications: a customer journey identifier identifying the individual user action steps corresponding to the respective communication, a location identifier corresponding to a location of a client device associated with the respective communication, and an intent associated with the individual user action steps corresponding to the respective communication.

19. The non-transitory machine-readable medium of claim 18, wherein the identifying the trend is based on the aggregated client-server communication data.

20. The non-transitory machine-readable medium of claim 15, wherein the first parameter corresponds to an output of the first service invocation, and wherein the second parameter corresponds to an input of the second service invocation.

* * * * *